United States Patent [19]

Calvin

[11] 4,313,118

[45] Jan. 26, 1982

[54] MICROWAVE PROXIMITY SENSOR

[76] Inventor: Noel M. Calvin, 2683 Buena Vista Way, Berkeley, Calif. 94708

[21] Appl. No.: 164,805

[22] Filed: Jun. 30, 1980

[51] Int. Cl.³ .................. G01S 13/04; H01Q 1/26
[52] U.S. Cl. .................. 343/701; 343/5 PD; 343/803
[58] Field of Search ............ 343/701, 702, 703, 5 PD, 343/803, 820

[56] References Cited

U.S. PATENT DOCUMENTS

| | | | |
|---|---|---|---|
| 2,939,130 | 5/1960 | Robinson | 343/701 |
| 2,943,189 | 6/1960 | Crump | 343/703 |
| 3,027,842 | 4/1962 | Hopkins | 343/701 |

*Primary Examiner*—Eli Lieberman
*Attorney, Agent, or Firm*—Herzig & Walsh, Inc.

[57] ABSTRACT

An improved microwave proximity sensor including ¼-wavelength folded dipole antenna performing the functions of a transmitting antenna, a receiving antenna, and a frequency determining element in a microwave oscillator.

2 Claims, 2 Drawing Figures

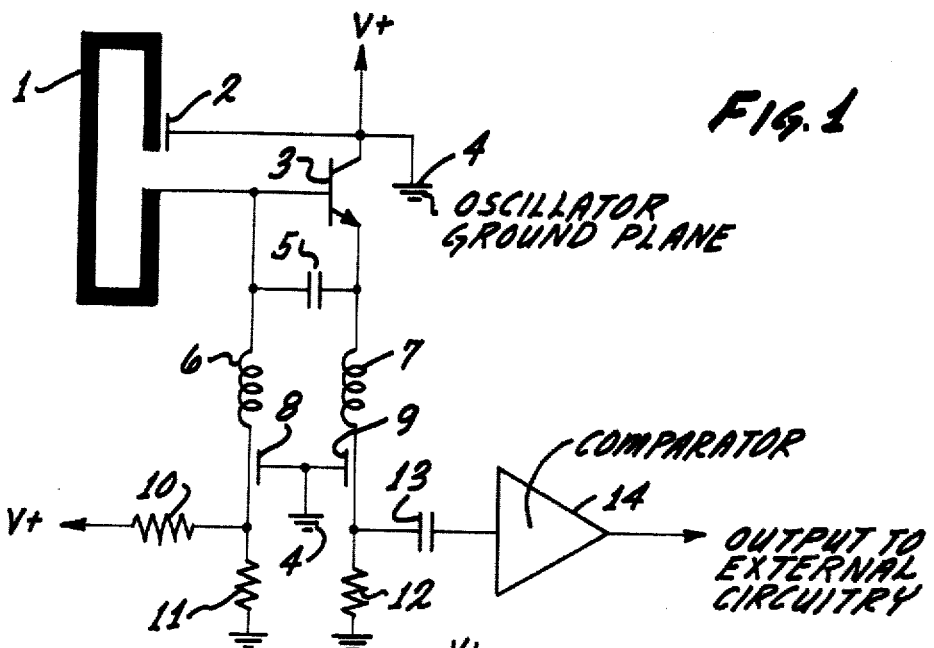
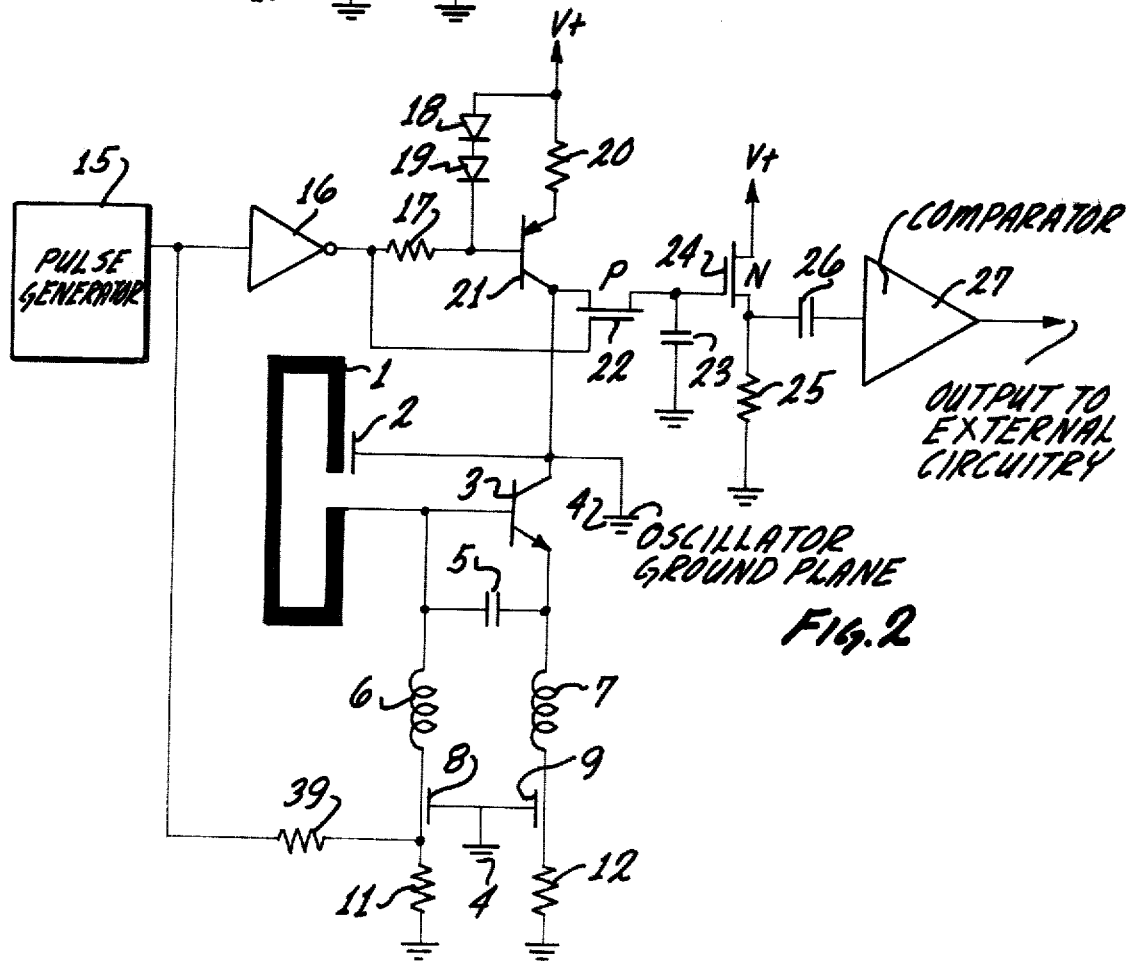

MICROWAVE PROXIMITY SENSOR

BACKGROUND OF THE INVENTION

1. Field of the Invention

The invention pertains to microwave proximity sensors for detecting the presence, absence or motion of an object of interest by means of generating and transmitting microwaves and by receiving and processing waves reflected from such object.

2. Description of the Prior Art

Microwave proximity sensors are devices which detect the presence, absence or motion of reflective objects of interest, such as a human body. The basis of their operation is that certain objects, including the human body, will reflect radio waves of the appropriate frequencies. A body in the vicinity of a microwave radio transmitter, for example, will reflect a portion of the transmitter's output back toward the transmitter, thus generating a standing wave. If the object should move, the standing wave pattern will shift, thereby causing a change in the field intensity in the vicinity of the transmitter. These characteristics have been utilized to provide equipment for detecting the presence, absence or motion of human bodies, for example, in such applications as security equipment.

Existing devices generally comprise a microwave oscillator, a transmitting antenna, a receiving antenna and a detector. The output of the oscillator is coupled to the transmitting antenna, which radiates the output in the desired direction. The receiving antenna is so placed that it can receive the transmitted signals directly and any reflected signal, and is connected to the detector. Changes in the standing wave pattern produce changes in the output of the receiving antenna which are recognized by the detector, thus providing sensing of changes in reflective bodies in the surroundings of the device.

Existing devices generally utilize solid-state devices to generate the microwave signal, which determines operation frequency and size and shape of transmitting and receiving antennas. Drawbacks of certain existing devices have been related to their complexity and cost, particularly of specialized microwave components, and further by the need for individual adjustment to match output frequency of the oscillator to the resonant frequency of the associated antenna. Additional drawbacks have been size and power consumption of existing proximity sensors, which have hindered their use in applications where compactness or portability of the sensor or power source is a significant consideration, as in the case of toys.

Thus, there has been a felt but unfulfilled need for a microwave sensor exhibiting simplicity and economy in structure and operation.

SUMMARY OF THE INVENTION

A microwave proximity sensor comprises microwave oscillator means having a selected frequency, the microwave oscillator means including ¼-wavelength dipole antenna means connected to comprise tank circuit means, and further including microwave transistor means coupled to the ¼-wavelength dipole antenna means to function as a lumped-constant oscillator means, said ¼-wavelength dipole antenna means being connected to radiate energy generated by said microwave oscillator means and to receive said radiated energy reflected back from reflective objects, the impedance of said ¼-wavelength dipole antenna means being variable in response to the phase and amplitude of said reflected energy, the power utilized by said microwave oscillator means being related to the impedance of said ¼-wavelength dipole antenna means, and detector means coupled to said microwave oscillator means for detecting changes in phase and amplitude of said reflected energy which charges are detected by said detector means as a change of power use by said microwave oscillator means.

In a preferred embodiment, the oscillator means is connected to a constant voltage supply through resistor means, and voltage across the resistor is proportional to the current drawn by the oscillator means, whereby changes in such voltage, caused by changes in amplitude and phase of the reflected waves due to motion in the vicinity of the ¼-wavelength antenna means, are detected by said detector means. In an alternative embodiment, the microwave oscillator means is connected to a constant current power supply whereby variations in the power use of the oscillator means are manifested in changes in voltage across the constant current source.

In particular applications, microwave proximity sensors in accordance with the invention may be utilized in connection with means for providing power to said oscillator means in pulses with a low duty cycle such that average power dissipation by the oscillator means is minimized.

BRIEF DESCRIPTION OF THE DRAWINGS

FIG. 1 is a schematic diagram of a microwave proximity sensor circuit in accordance with the invention; and FIG. 2 is a schematic diagram of a microwave proximity sensor in an alternative embodiment, in accordance with the invention.

DETAILED DESCRIPTION OF THE INVENTION

As depicted in FIG. 1, a microwave proximity sensor in accordance with the invention includes a ¼-wavelength folded dipole antenna 1. The antenna 1 is coupled to a capacitance 2 comprising a ground return therefor and is further connected to microwave transistor 3. The collector of microwave transistor 3 is connected to a source of constant voltage indicated by "V+" such as a battery. Capacitance 2 is connected to a ground plane 4 constituting a radio frequency ground. Ground plane 4 may be any metal surface at least ¼-wavelength on the side, mounted approximately 1/10-wavelength from the antenna. The wavelength referred to is that which is transmitted by the antenna 1 and generated by the sensor as fully described hereinbelow. Inductance means 6 is connected to the base of transistor 3 and to a capacitance 5.

Inductance means 7 is connected in parallel to inductance means 6. A capacitance 8 is connected to ground plane 4. Also connected to ground plane 4 is capacitance means 9. Resistor means 10, 11 are connected to the base of transistor 3, resistor means 11 being connected also to ground. Resistor means 12 is connected in parallel to resistor means 11 and is also connected to ground as well as to inductance means 7. Capacitance 5 provides feedback for oscillation. Base bias of transistor 3 is set by resistor 10, 11, and capacitance 8 functions as a bypass applied to the base of the transistor 3 through inductance means 6. Current from the emitter of transistor 3 is converted to a voltage by resistor 12, which is isolated from the emitter by capacitor means 9 and inductor means 7. Resistor 12 thus functions as a converter means for converting power drain from the system to voltage. Capacitance means 9, capacitance 5 and inductance 7 function as an RF choke for the emitter of transistor 3.

A capacitance 13 is connected between resistor means 12 and comparator means 14. The comparator means is of standard type which will respond to rapid changes in voltage exceeding a selected threshold level by producing output that can be used to control external circuitry, such as an alarm or light switch (not shown). The comparator thus functions as a detector of changes in the characteristics of the reflected microwaves.

In operation, the system depicted in FIG. 1 generates microwave energy waves radiated through dipole antenna means 1. If, in the vicinity of the antenna 1, there is an object, such as a human body, which reflects such radiated energy, such reflection will occur in the form of reflected energy waves. The combination of transmitted and reflected waves will set up a standing wave, which will vary with changes in shape and position of the reflective object. The change in antenna impedance depends on the distance the reflected wave must travel. A wave which must travel a distance equal to an even number of ½-wavelengths will reinforce the transmitted wave and increased antenna impedance. Conversely, the reflected wave travelling an odd number of ½-wavelengths will cancel a portion of the transmitted wave and thus decrease antenna impedance. A moving object in the vicinity of the antenna will thus cause alternating increases and decreases in antenna impedance, the frequency of the alternations being determined by the object speed and the magnitude by the object's size. Such changes in antenna impedance will produce corresponding changes in power consumption by the oscillator. Such changes in power consumption are reflected in changes in the voltage across comparator 14, whose output to external circuitry will manifest such change.

An alternative embodiment of the invention is depicted in FIG. 2.

The system depicted in FIG. 2 is the same as that described and depicted in connection with FIG. 1, except that the positive power supply connection is made through a current source other than the direct connection to a source of constant voltage, as in the embodiment of FIG. 1. A further difference is that the comparator of the system depicted in FIG. 1 is positioned somewhat differently in the circuit, as is fully described hereinbelow. The same reference numerals used in connection with the description with respect to FIG. 1 above are employed in the description of the alternative embodiment.

The collector of transistor 3 is connected to a current source comprising a transistor 21 connected to resistor means 17, 20 and diode means 18, 19 and through resistor means 22 a source of constant voltage V+. Resistor means 17 and diode means 18, 19 form a constant voltage source providing a bias of a selected voltage, 1.2 volts in a typical application, for transistor 21. As a result, transistor 21 conducts sufficiently to maintain a voltage of one-half the bias voltage or, in the specific example given, 0.6 volt, across resistor means 20. A pulse generator 15 and CMOS inverter 16 control the current source. The pulse generator 15 produces positive-going pulses, with a duty cycle that may be as low as 0.01 percent. During each pulse, the output of inverter 16 goes low, turning on the current source. Concurrently, pulse generator 15 drives a voltage divider formed by resistor means 39, 11, to provide bias for the base of transistor 3, thereby turning it on. By using a duty cycle of 1 percent, power dissipation can be reduced to 1 percent of its peak value with no decrease in sensitivity. Thus, power consumption can be reduced to a minimum, enabling the invention to operate from compact batteries.

When the oscillator including dipole 1 and transistor 3 is turned on, the collector voltage of transistor 3 reaches an equilibrium value which is substantially proportional to the impedance of antenna 1. This voltage is acquired by a sample-and-hold circuit. This circuit comprises MOS field effect transistor (MOSFET) transistors 22, 24 connected to transistor 21 and transistor 3. MOSFET transistor 22 is of the P-channel type, and MOSFET transistor 24 is of the N-channel type. During a pulse, the gate of MOSFET transistor 22 is held low, thereby turning transistor 3 on, causing a capacitor 23 connected between said transistors 22, 24 to change to the collector voltage of transistor 3. Between pulses, the gate of MOSFET transistor 22 is held high, thus turning that element off. N-channel MOSFET transistor 24 is connected as a voltage follower and has a very high input impedance which minimizes the droop of capacitor 23 between pulses.

Output of N-channel MOSFET transistor 24 is AC-coupled by capacitor means 26 to comparator means 27, which as described in connection with FIG. 1 responds to short-term changes in voltage caused by motion in the vicinity of antenna 1.

Total power consumption of the circuit will be the sum of the power consumed by the pulse generator 15 and the comparator 27 in addition to the steady-state power drain of the microwave oscillator, multiplied by the duty cycle of the pulse generator 15. Power consumption of 500 $\mu$w can be obtained with use of standard micropower circuits for the pulse generator and comparator, together with a duty cycle of 1 percent. Such power consumption is sufficiently low to permit continuous operation from standard batteries.

Thus, a microwave proximity sensor is provided in accordance with the invention which utilizes inexpensive circuit elements, is compact, and provides efficient power consumption that is sufficiently low to permit the use of standard batteries and which thus has application to security systems as well as such items as toys.

Though particular embodiments of the invention have been described and depicted hereinabove, the invention is to be defined solely by the appended claims interpreted in light of the specification.

What is claimed is:

1. A microwave proximity sensor comprising:
    microwave oscillator means, said microwave oscillator means including ¼-wavelength dipole antenna means connected to comprise tank circuit means, and further including microwave oscillator means coupled to said ¼-wavelength dipole antenna means to function as lumped constant oscillator means, whereby said ¼-wavelength dipole antenna means functions as a resonance frequency determining element for said microwave oscillator means, said ¼-wavelength dipole antenna means being connected to radiate energy generated by said microwave oscillator means and to receive energy reflected back from reflective objects, the impedance of said ¼-wavelength dipole antenna means being variable in response to the phase and amplitude of said reflected energy, and the power consumed by said microwave oscillator means being related to the impedance of said ¼-wavelength dipole antenna means;

converter means for converting power to voltage whereby a voltage proportional to said power consumption of said microwave oscillator means is generated, said converter means comprising constant current source means connected to said oscillator means as a power supply therefor such that the voltage drop across said constant current source means is substantially proportional to the power consumption of said microwave oscillator means;

comparator means coupled to said constant current source means for producing output responsive to changes in said voltage;

pulse generator means coupled to said constant current source means, said pulse generator means producing pulses having a low duty cycle, for providing pulses to turn on said constant current source means; and sample and hold circuit means coupled to said constant current source means such that the voltage output of said constant current source means is fed to said sample and hold circuit means, the latter being connected such that its output is connected to said comparator means.

2. A microwave proximity sensor comprising:

microwave oscillator means, said microwave oscillator means including ¼-wavelength dipole antenna means connected to comprise tank circuit means, and further including microwave oscillator means coupled to said ¼-wavelength dipole antenna means to function as lumped constant oscillator means, whereby said ¼-wavelength dipole antenna means functions as a resonance frequency determining element for said microwave oscillator means, said ¼-wavelength dipole antenna means being connected to radiate energy generated by said microwave oscillator means and to receive energy reflected back from reflective objects, the impedance of said ¼-wavelength dipole antenna means being variable in response to the phase and amplitude of said reflected energy, and the power consumed by said microwave oscillator means being related to the impedance of said ¼-wavelength dipole antenna means;

converter means for converting power to voltage whereby a voltage proportional to said power consumption of said microwave oscillator means is generated, said converter means comprising constant current source means connected to said oscillator means as a power supply therefor such that the voltage drop across said constant current source means is substantially proportional to the power consumption of said microwave oscillator means;

comparator means coupled to said constant current source means for producing output responsive to changes in said voltage;

pulse generator means coupled to said constant current source means, said pulse generator means producing pulses having a low duty cycle, for providing pulses to turn on said constant current source means;

sample and hold circuit means coupled to said constant current source means such that the voltage output of said constant current source means is fed to said sample and hold circuit means, the latter being connected such that its output is connected to said comparator means, said sample and hold circuit means comprising MOS field effect transistor means.

* * * * *